United States Patent [19]

Chakrabarti

[11] 4,178,203
[45] Dec. 11, 1979

[54] METHOD OF INCREASING THE STRENGTH OF WET GLASS FIBER MATS MADE BY THE WET-LAID PROCESS

[75] Inventor: Paritosh M. Chakrabarti, Wayne, N.J.

[73] Assignee: GAF Corporation, New York, N.Y.

[21] Appl. No.: 872,002

[22] Filed: Jan. 24, 1978

[51] Int. Cl.² .............................................. D21H 5/18
[52] U.S. Cl. .................................. 162/156; 162/158; 162/182; 162/184; 162/185; 162/186
[58] Field of Search ............... 162/152, 156, 158, 183, 162/182, 184, 186, 135, 185; 65/3 C; 428/375, 378

[56] References Cited

U.S. PATENT DOCUMENTS

| | | | |
|---|---|---|---|
| 2,721,139 | 10/1955 | Arledter | 162/145 |
| 3,228,825 | 1/1966 | Waggoner | 162/156 |
| 3,766,003 | 10/1973 | Schuller et al. | 162/156 |
| 4,007,083 | 2/1977 | Ring et al. | 162/184 |

FOREIGN PATENT DOCUMENTS

| | | | |
|---|---|---|---|
| 838373 | 2/1975 | Belgium | 162/158 |
| 685665 | 5/1964 | Canada | 162/157 R |
| 787649 | 6/1968 | Canada | 162/157 R |

*Primary Examiner*—S. Leon Bashore
*Assistant Examiner*—Peter Chin
*Attorney, Agent, or Firm*—Walter C. Kehm; Walter Katz

[57] ABSTRACT

In accordance with the present invention, there is provided herein a method of increasing the strength of wet glass fiber mats prepared by the wet-laid process. The wet-strength of such freshly prepared glass fiber mats are improved in this invention by treating the wet mat with a dilute solution of an anionic surfactant. As a feature of the invention, the wet-strength of such mats are increased substantially so that they may be conveniently handled and transferred, even manually, for further processing, e.g. for applying binders and drying, into the finished glass fiber mat product.

13 Claims, No Drawings

METHOD OF INCREASING THE STRENGTH OF WET GLASS FIBER MATS MADE BY THE WET-LAID PROCESS

BACKGROUND OF THE INVENTION

1. Field of the Invention

This invention relates to the manufacture of uniform, high quality, glass fiber mat products made by the wet-laid process, and, more particularly, it is concerned with a method of improving the wet-strength of freshly prepared, wet glass fiber mats, so that they can be conveniently handled and transferred, even manually, in the production line.

2. Description of the Prior Art

High strength, uniform thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper or asbestos making machinery, as described, for example, in the book by O.A. Battista, *Synthetic Fibers in Papermaking* (Wiley) N.Y. 1964. A number of U.S. Patents also provide a rather complete description of the wet-laid process, including U.S. Pat. Nos. 2,906,660; 3,012,929; 3,050,427; 3,103,461; 3,228,825; 3,760,458; 3,766,003; 3,838,995 and 3,905,067. The German OLS No. 2454354 (Fr. Demande 2,250,719), June, 1975, also is pertinent art in this field.

In general, the known wet-laid process for making glass fiber mats comprises first forming an aqueous suspension of short-length glass fibers under agitation in a mixing tank, then feeding the suspension through a moving screen on which the fibers enmesh themselves into a freshly prepared wet glass fiber mat, while the water is separated therefrom. However, unlike natural fibers, such as cellulose, or asbestos, glass fibers do not disperse well in water. Actually, when glass fibers, which come as strands or bundles of parallel fibers, are put into water and stirred, they do not form a well-dispersed system. In fact, upon extended agitation, the fibers agglomerate as large clumps which are very difficult to redisperse.

In an attempt to overcome this inherent problem with glass fibers, it has been the practice in the industry to provide suspending aids for the glass fibers, including surfactants, in order to keep the fibers separated from one another in a relatively dispersed state. Such suspending aids usually are materials which increase the viscosity of the medium so that the fibers can suspend themselves in the medium. Some suspending aids actually are surfactants which function by reducing the surface attraction between the fibers. Unfortunately, however, none of the available suspending aids are entirely satisfactory for large volume manufacture of useful, uniform glass fiber mats.

In our copending patent application, Ser. No. 851,863, filed Nov. 15, 1977, there is described an improved method of preparing chopped glass fiber dispersions in water by admixing the fibers with a small amount of an amine oxide. While the present invention is not limited to this method of forming the initial glass fiber dispersions, it is to be considered a preferred embodiment thereof, and the examples which follow will reflect the advantageous use of amine oxide surfactants to form the initial glass fiber dispersions. However, any other dispersant may be used, including the select quaternary ammonium cationic surfactants described in our copending application, Ser. No. 876,651, filed Feb. 10, 1978.

Of course, since the dispersing aid acts to suspend the individual glass fibers away from each other, the wet-strength of the wet mat formed on the screen may be lessened to some degree by the use of good dispersion aids, such as amine oxides.

The poorer wet-strength of such mats, however, does not mean poor strength of the dry mats and/or of the final dry and resin-bonded mat product, but is can create some problems during further processing of the wet mat. In commercial production of glass mats, for example, the wet mat formed on the foraminous belt is transferred to other units, such as the drying and the bonding resin application units of the production line. In each of these units, the wet mat is supported on felts or drums; however, it does remain unsupported at the transfer points from one unit to another. Furthermore, at the front end of the line, the wet mat from the foraminous belt often is manually transferred from one unit to another. If the wet mat as formed is too weak, it cannot be easily transferred manually from one unit to another. Furthermore, poor wet strength leads to occasional breakage of the mat in unsupported transfer areas during production, leading to undesirable interruptions and material waste.

The materials applied to the wet-mat in this invention to improve its wet-strength is to be distinguished from the conventional resin binders which are applied to the dry mat product. The format materials are used herein only improve the wet strength of the wet mat sufficient to enable it to be transported, even manually, through the production line.

In general, for a wet-laid glass fiber process to be effective, it is necessary that it meet several rigid criteria simultaneously which can provide means for making the desired high quality, uniform finished glass fiber mat product at a rapid rate of production in an economically acceptable process. For example, the process preferably should provide a uniform dispersion of glass fibers in water effectively at low surfactant concentrations, at high glass fiber consistencies, preferably not be accompanied by a substantial increase in the viscosity of the medium, and should be capable of producing wet glass fiber mats at the screen which have a uniform distribution of fibers characterized by a multidirectional array of fibers.

The process also should provide means for improving the wet-strength properties of such freshly prepared wet glass fiber mats, so that it can be conveniently trensferred, even manually, to other units in the production line, such as the drying and binding units, without tearing or breaking the wet mat during handling. The means for improvement in wet-strength of such wet mats should be effective for such mats formed from any suspending aid or dispersing surfactant, even with those which provide excellent glass fiber dispersions. The materials used for treating the wet mats to improve its strength preferably should be readily available, at low cost, and be capable of use either by direct spraying in dilute solution onto the wet mats at any convenient point in the production line.

These and other objects and features of the invention will be made apparent from the following more particular description of the invention.

SUMMARY OF THE INVENTION

In accordance with the present invention, there is provided herein an improved method for making glass fiber mats by the wet-laid process. The current invention is concerned particularly with a method of improving the wet-strength of wet mats made from surfactant-aided glass fiber dispersions, such as described in the aforementioned copending application. The process of improving the wet-strength of these mats, according to this invention, comprises treating the wet mat with a dilute solution of an anionic surfactant. A convenient method of carrying out this post-treatment consists of spraying the solutions directly onto the wet mats, whereupon its wet strength is improved dramatically and immediately. The solution may be applied to the wet mat at any convenient point in the production-flow; however, usually it is advisable to apply it upon formation of the wet mat at the screen. Subsequent processing of the treated mat then can be carried out without possibility of tearing or breaking of the mat.

DETAILED DESCRIPTION OF THE INVENTION

The molecular structures of the anionic surfactants that are used to improve wet-strength in the current invention contain two essential segments: (a) a hydrophobic segment containing from 8 to 30 carbon atoms, and (b) an anionic segment selected from among carboxy, sulfate ester, phosphate ester, sulfonic acid and phosphonic acid groups, generally in the form of their alkali metal, ammonium or alkylammonium salts. Optionally, the molecule may also contain a polyalkyleneoxy chain, but the number of alkyleneoxy units per molecule preferably should not exceed 10. The preferred alkyleneoxy unit is the ethyleneoxy unit.

The hydrophobic segment may be alkyl, aryl, alkaryl, substituted alkyl, substituted aryl or substituted alkaryl radicals. Furthermore, the alkyl groups can either be straight or branched chain and saturated or unsaturated. Suitable substitutent groups, when present, include hydroxy, alkoxy, acyloxy, carboxy lower alkyls, thio, alkylthio, acylamido and halogen groups.

Anionic surfactants which can be used in this invention include both soap and non-soap surfactant compounds. Examples of suitable soaps are the sodium, potassium ammonium and alkylolammonium salts of higher fatty acids ($C_{10}$-$C_{20}$). Particularly useful are the sodium or potassium salts of the mixtures of fatty acids derived from coconut oil and tallow, i.e., sodium of potassium tallow and coconut soap. Examples of anionic organic non-soap surfactant compounds are the water soluble alkali metal salts of organic sulfuric reaction products having in their molecular structure an alkyl radical containing from about 8 to about 30 carbon atoms and a radical selected from the group consisting of sulfonic acid and sulfuric acid ester radicals. (Included in the term alkyl is the alkyl portion of higher acyl radicals). Important examples of the synthetic surfactants which form a part of the present invention are the sodium or potassium alkyl sulfates, especially those obtained by sulfating the higher alcohols ($C_8$-$C_{18}$ carbon atoms), sodium or potassium alkyl benzene-sulfonates, such as are described in U.S. Pat. Nos. 2,220,009 and 2,477,383, in which the alkyl group contains from about 9 to about 15 carbon atoms; other examples of alkali metal alkylbenzene sulfonates are those in which the alkyl radical is a straight or branched chain aliphatic radical containing from about 10 to about 20 carbon atoms for instance, in the straight chain variety 2-phenyl-dodecansulfonate and 3-phenyl-dodecane-sulfonate; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g. tallow or coconut oil alcohols) and about 1 to 6 moles of ethylene oxide; sodium or potassium salts or alkylphenol ethylene oxide ether sulfate with about 1 to about 10 units of ethylene oxide per molecule and in which the alkyl radicals contain about 9 to about 20 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; and others known in the art.

Other useful anionic surfactants are described in U.S. Pat. Nos. 3,844,952 and 3,976,586 and these are included by reference for use in the process of this invention.

Typical examples of anionic surfactants particularly useful for the present invention are sodium alkyl aryl sulfonates, such as sodium dedecylbenzene sulfonate (Soropon ® SF-78) from GAF Corporation, sodium salts of sulfonated naphthalene formaldehyde condensates, such as the Blancols ® (GAF), sodium alkane sulfonates, commonly known as SAS, sodium alkyl naphthalene sulfonates, such as Nekal ® BX-78 (GAF), sodium lauryl sulfate, sodium lauryl ether sulfate (Sipon ® ESY) from Alcolac, Inc., sodium nonylphenoxypolyethyleneoxy ethyl sulfate, such as Alipal ® CO-433 (GAF), dialkyl esters of sodium sulfosuccinate, such as Nekal ® WT-27 (GAF), fatty acid esters of sodium isethionate, such as Igepon ® AP-78 (GAF), sodium N-methyl-N-acyl taurates, such as Igepon ® T-43 (GAP), and soaps, such as sodium oleate or sodium coconate.

In a typical wet-laid process for making glass fiber mats, a stock suspension of the fibrous material of predetermined fiber consistency is prepared in a mixing tank. The suspension then is pumped into a head box of a papermaking machine where it may be further diluted with water to a lower consistency. The diluted suspension then is distributed over a moving foraminous belt under suction to form a nonwoven fiber structure or wet mat on the belt. This wet mat structure then is treated as described herein to improve its wet-strength. The thus-treated wet-mat may be dried, if necessary, then furnished with a resin binder, and, finally, thoroughly dried to give a finished non-woven glass fiber mat product.

The initial glass fiber filaments or strands generally are chopped into bundles of fibers about ¼" to 3" in length, usually about ½" to 2", and preferably about 1" long, and usually about 3 to 20 microns in diameter, and, preferably about 15 microns. In a preferred embodiment of the invention, the glass fibers are added to water containing an amine oxide surfactant, which forms a well-dispersed fiber composition. Suitably, the amine oxide is present at a concentration of about 5-500 ppm of the solution and preferably about 10-25 ppm. Alternatively, the chopped glass fibers may be coated initially by spraying or otherwise applying the amine oxide surfactant thereon, and then dispersing the coated fibers in the aqueous medium. Suitably, the coated fibers contain about 0.01 to 1% by weight of the amine oxide, and, preferably, between 0.025 to 0.25%. Other suspending aids or surfactants known in the art also may be used, however.

The glass fibers may be dispersed in the amine oxide surfactant at relatively high fiber consistencies while still retaining the effective dispersion characteristics of the composition. For example, a fiber consistency of from about 0.001% to about 3.0% may be used, and, preferably, about 0.05% to about 1% is employed, based upon the weight of the fibers in the water. Such compositions furnish excellent dispersions when agitated in conventional mixing equipment. As mentioned, if desired, the highly concentrated fiber dispersion compositions may be diluted at the head box, usually to a consistency of about 0.1% to about 0.3%, and, preferably about 0.2%, which, however, is still a highly concentrated fiber dispersion by conventional standards.

The dispersion compositions are formed without any substantial change in the viscosity of the medium or of generation of unwanted foams during the process. Furthermore, the dispersion preferably are prepared at or near a neutral pH condition, or perhaps under slightly alkaline conditions, again, without affecting the good quality of the dispersions, or of the finished glass mat products produced therefrom.

These dispersion compositions produce wet glass fiber mats which have a high density of fibers therein and which are uniformly distributed throughout the mat in a multidirectional array. The finished mats show excellent tensile strength properties, too. The rate of production of the mats is very rapid, indeed, in this invention. In fact, a rate of mat production of over 500 linear ft./min. using conventional paper-making equipment is readily achievable in this process.

The amine oxide surfactants for forming the initial glass fiber dispersing are tertiary amine oxides having the formula:

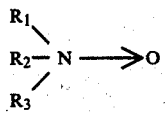

where $R_1$, $R_2$ and $R_3$ suitably are hydrocarbon groups containing between 1–30 carbon atoms. The hydrocarbon groups can be aliphatic or aromatic, and, if aliphatic, can be linear, branched or cyclic in nature, and can be the same or different in each radical. The aliphatic hydrocarbon radical can contain ethylenic unsaturation. Preferably the aliphatic groups are selected from among alkyl groups, such as lower alkyl or hydroxyalkyl groups having from 1–4 carbon atoms, and substituted alkyl groups thereof, or long chain alkyl groups, having from 12–30 carbon atoms, such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$ and $R_3$ groups is about 14–40 carbon atoms, and most preferably, about 18–24 carbon atoms.

Typical amine oxides include Aromox DMHT from Armak, a dimethyl hydrogenated tallow amine oxide, Ammonyx SO from Onyx, a dimethylstearylamine oxide, Aromox DM16 from Armak, a dimethylhexadecylamine oxide, and Aromox T/12 from Armak, a bis(2-hydroxyethyl) tallow amine oxide, where $R_T$=3% tetradecyl, 27% hexadecyl, 16% octadecyl, 48% octadecenyl and 6% octadecadienyl. $R_{HT}$ = hydrogenated $R_T$ (saturated), although others known in the art may be used as well.

The examples which follow will further illustrate the invention, but are not to be considered as being limiting of the principles or practice of the invention.

EXAMPLE 1

Formation of Wet Glass Fiber Mats by Wet-Laid Process (Laboratory Control Experiment)

To 7 liters of a 50 ppm solution of dimethylhydrogenated tallowamine oxide (Aromox DMHT from Armak) was added 7 g of chopped E-glass (1½″ long, 15 microns diameter), with stirring, to form a good fiber dispersion. The dispersion then was carried through a laboratory Williams paper-making apparatus to form a 10″×11″ (=110 sq. inches) wet mat. The glass fibers in this wet mat were very evenly distributed throughout; however, it was too weak to be lifted by holding at the two corners. It could be transferred from the frame of the apparatus to another flat support (for drying) only by putting the flat surface on the frame and carefully turning the frame upside down.

EXAMPLES 2-9

(Invention Experiments)

EXAMPLE 2

The procedure of Example 1 was repeated except that the wet mat was lightly sprayed with a 0.5% active solution of Soropon ®SF-78 (sodium dodecylbenzene sulfonate) from GAF. The wet mat now was strong enough to be lifted up from the frame by holding it at two corners and transferred directly to another support for drying. The finished, dried mat showed excellent mat qualities.

EXAMPLE 3

The procedure of Example 2 was repeated using a 0.5% solution of Blancol ®N (sodium salt of sulfonated naphthalene formaldehyde condensate) from GAF. The wet mat again was strong enough to be lifted up from the frame by holding it at two corners for transfer to the drying unit.

EXAMPLE 4

The procedure of Example 2 was repeated using a 0.5% solution of Nekal ®BX-78 (sodium alkylnaphthalene sulfonate) from GAF, with similar effective results in improving the wet strength of the mat.

EXAMPLE 5

The procedure of Example 2 was repeated using a 0.5% solution of Sipon ®ESY (sodium laurylether sulfate) from Alcolac, Inc., with similar positive results.

EXAMPLE 6

The procedure of Example 2 was repeated using a 0.5% solution of Alipal ®CO-433 (sodium nonylphenoxypolyethyleneoxy ethyl sulfate) from GAF, with similar results.

EXAMPLE 7

The procedure of Example 2 was repeated using a 0.5% solution of Nekal®WT-27, (a dialkylester of sodium sulfosuccinate) from GAF, with similar results.

EXAMPLE 8

The procedure of Example 2 was repeated using a 0.5% solution of Igepon®AP-78 (a fatty acid ester of sodium isethionate) from GAF, with similar results.

EXAMPLE 9

The procedure of Example 2 was repeated using a 0.5% solution of Igepon®T-43 (a sodium N-methyl-N-acyl taurate) from GAF, with similar results.

EXAMPLE 10

The procedure of Example 2 was repeated using a 0.5% solution of a soap, sodium oleate, with similar positive results in improving the wet strength of the freshly prepared wet mat.

EXAMPLE 11

(Pilot Production Unit Control Experiment)

In this example, a conventional pilot production unit was employed. Accordingly, a 0.5% fiber glass dispersion was prepared in a mixing tank using a 20 ppm solution of dimethyl hydrogenated tallowamine oxide—(Aromox DMHT) from Armak. The fiber glass used was chopped E-glass (15 micron diameter and 1½" long). This dispersion was pumped into the headbox of the pilot machine and simultaneously diluted with fresh 20 ppm solution of dimethyl hydrogenated tallow amine oxide to give a final glass fiber consistency in the headbox of 0.14%. This diluted dispersion then was distributed onto a moving foraminous belt at such a rate that a wet mat of about 2 lbs. glass/100 sq. ft. was obtained. The wet mat so formed was of excellent quality insofar as uniformity of fiber distribution and fiber array was concerned; however, it had relatively poor wet-strength characteristics as formed. As a result, it was difficult to transfer this wet mat from the belt to the surfaces of the drum dryers across an unsupported gap of about 9 inches. The wet mat often broke as it was being manually transferred and even though the continuous wet mat flowed from the belt to the drier, the wet mat often broke at the unsupported junctions whenever the machine was stopped or if extra tension was applied at the unsupported bridging points.

EXAMPLE 12

The procedure of Example 11 was repeated except that a 0.1% solution of Blancol®N (sodium salt of sulfonated napthalene formaldehyde condensate) from GAF was lightly sprayed onto the wet mat. The thus-treated wet mat now had sufficient wet-strength to be easily transferred manually to the drum driers without breakage.

EXAMPLE 13

(Control Experiment - Coated Glass Fibers)

7 g of chopped E-glass was added to 700 ml of a 0.25% solution of Ethomeen®T-25 (poly (15) ethoxylated tallowamine) from Armak. The mixture was agitated for a few minutes and filtered in a Buchner funnel under suction. The glass fibers, after filtration, retained about 40% of their own weight of the solution. The coated glass fibers then were air dried and suspended in 700 ml of a 0.1% solution of Arquad®18 (stearyl trimethyl ammonium chloride) from Armak, and agitated, whereupon a usable suspension of the glass fibers resulted. This suspension then was used to make a 10"×11" (110 sq. inches) wet mat using the paper-making apparatus. This wet mat, however, again, was too weak to be lifted up from the frame by holding at its two corners.

EXAMPLE 14

The procedure of Example 13 was repeated except that in addition, the wet-mat formed on the Williams apparatus was sprayed with a 0.5% solution of sodium oleate. The treated wet mat now was strong enough to be lifted intact by holding at its two corners.

EXAMPLE 15

The procedure of Example 14 was repeated except that Soropon®SF-78 (sodium dodecylbenzene sulfonate) from GAF, was used in place of the sodium oleate. The thus-treated wet mat again was much stronger so that it could be handled manually for further processing into a finished glass fiber mat product.

While the invention has been described with particular reference to certain embodiments thereof, it will be understood that certain changes and modifications may be made which are within the skill of the art. Accordingly, it is intended to be bound by the appended claims only.

What is claimed is:

1. In the manufacture of glass fiber mat products by the wet-laid process at a high rate of production wherein an aqueous dispersion of glass fibers which contains a surfactant dispersant is formed from bundles of glass fibers of about ¼ to 3 inches in length and tertiary amine oxide or cationic quaternary ammonium dispersant compound at a concentration of about 5–500 ppm and at a fiber consistency of about 0.001 to 3%, which dispersion is passed through a matforming screen to form a freshly-prepared wet-mat of said fibers, the improvement which comprises:
    applying to said freshly-prepared wet-mat an anionic surfactant selected from the group consisting of (1) an anionic surfactant having at least (a) a hydrophobic segment containing from 8 to 30 carbon atoms selected from the groups consisting of alkyl, aryl, alkylaryl, substituted alkyl, and substituted alkenyl groups, said groups being straight or branched chain, saturated or unsaturated, and (b) an anionic segment selected from the groups consisting of carboxy, sulfate ester, phosphate ester, sulfonic acid and phosphonic acid, or (2) a soap selected from sodium, potassium, ammonium and alkylolammonium salts of higher $C_{10}$–$C_{20}$ fatty acids,
    thereby to improve the wet-strength properties of said freshly-prepared wet-mat so that it can be readily handled and transferred during other steps in said process, into a finished glass fiber mat product.

2. The process according to claim 1 wherein said soap is sodium oleate.

3. A method according to claim 1 wherein the substitutent of the substituted groups of the hydrophobic segment of the anionic surfactant (a) is selected from the group consisting of hydroxy, alkoxy, acyoxy, carboxy lower alkyl, thio, alkylthio, acylamido and halogen.

4. A method according to claim 1 wherein the anionic segment of the anionic surfactant (a) further has a polyalkyleneoxy chain and wherein the number of alkyleneoxy units of said polyalkyleneoxy chain does not exceed 10.

5. The process according to claim 4 wherein said alkyleneoxy unit is ethyleneoxy.

6. The process according to claim 1 wherein said anionic surfactant (1) is selected from the group consisting of alkyl aryl sulfonates, sulfonated naphthalene formaldehyde condensates, alkane sulfonates, lauryl ether sulfates, alkyl phenoxypolyethyleneoxy ethyl sulfates, dialkyl esters of sulfosuccinates, and N-alkyl-N-acyl taurates.

7. The process according to claim 1 wherein said dispersion is formed by mixing said bundles of fibers in an aqueous medium with a tertiary amine oxide surfactant having the formula:

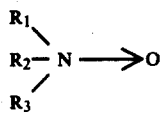

where $R_1$, $R_2$ and $R_3$ are selected from the group consisting of aliphatic and aromatic hydrocarbon radicals, substituted or unsubstituted, containing between 1 and 30 carbon atoms, being the same or different, the sum of the carbon atoms of $R_1$, $R_2$ and $R_3$ being between about 14 to 40.

8. A method according to claim 7 wherein the $R_1$, $R_2$ and $R_3$ radicals are aliphatic radicals.

9. A method according to claim 8 wherein said aliphatic radicals are selected from alkyl, hydroxyalkyl.

10. A method according to claim 7 wherein said sum is about 18 to 24.

11. A method according to claim 7 wherein at least one of said aliphatic radicals is lower alkyl or hydroxy lower alkyl, and at least other one of said aliphatic radicals is a long chain alkyl or alkyl substituted group.

12. A method according to claim 7 wherein said amine oxide is selected from the group consisting of dimethyl hydrogenated tallow amine oxide, dimethylstearylamine oxide, diemethylhexadecylamine oxide and bis(2-hydroxyethyl) tallow amine oxide.

13. A method according to claim 7 which further comprises:
   precoating said glass fibers with said amine oxide, having the formula of claim 7 prior to forming said aqueous dispersion.

* * * * *